United States Patent [19]
Delam

[11] Patent Number: 4,533,109
[45] Date of Patent: Aug. 6, 1985

[54] ELASTIC SUPPORT UNIT

[75] Inventor: Heinz Delam, Berlin, Fed. Rep. of Germany

[73] Assignee: Gerb Gesellschaft für Isolierung MBH & Co KG, Berlin, Fed. Rep. of Germany

[21] Appl. No.: 312,873

[22] Filed: Oct. 19, 1981

[30] Foreign Application Priority Data

Oct. 22, 1980 [DE] Fed. Rep. of Germany ....... 3040181

[51] Int. Cl.³ .............................................. F16M 13/00
[52] U.S. Cl. ...................................... 248/542; 52/167; 188/381; 248/565; 248/566; 248/618
[58] Field of Search ............... 248/542, 565, 566, 568, 248/570, 618, 623, 638, 636, 562, 550, 580, 581, 583, 602; 52/167; 188/381; 267/140.1

[56] References Cited

U.S. PATENT DOCUMENTS

| | | | |
|---|---|---|---|
| 2,175,784 | 10/1939 | Rosenzweig | 248/623 |
| 2,634,069 | 4/1953 | Drake et al. | 248/583 |
| 2,893,470 | 7/1959 | Peller | 248/565 |
| 3,145,012 | 8/1964 | Kfoury | 248/638 |
| 3,814,357 | 6/1974 | Röntgen | 248/638 |
| 4,320,549 | 3/1982 | Greb | 52/167 |
| 4,330,103 | 5/1982 | Thuries et al. | 52/167 |
| 4,371,143 | 2/1983 | Ishida et al. | 52/167 |

FOREIGN PATENT DOCUMENTS

0209923 1/1924 United Kingdom ............... 248/580

Primary Examiner—William H. Schultz
Assistant Examiner—Ramon O. Ramirez
Attorney, Agent, or Firm—Michael J. Striker

[57] ABSTRACT

An elastic support unit has a supporting element including an elastic part and a sliding part arranged so that under the action of load, first the elastic part is elastically deformed and the supporting element acts within a first elastic region, then the sliding part allows the supporting element to slide over a slide path and the supporting element acts within a second sliding region, and thereafter upon passing the sliding region the supporting element uses its stress reserves and after exceeding the stress reserves uses plastic deformation of the elastic part, so as to form thereafter an elastic stop and thereby act in a third additional region.

15 Claims, 3 Drawing Figures

F I G. 3
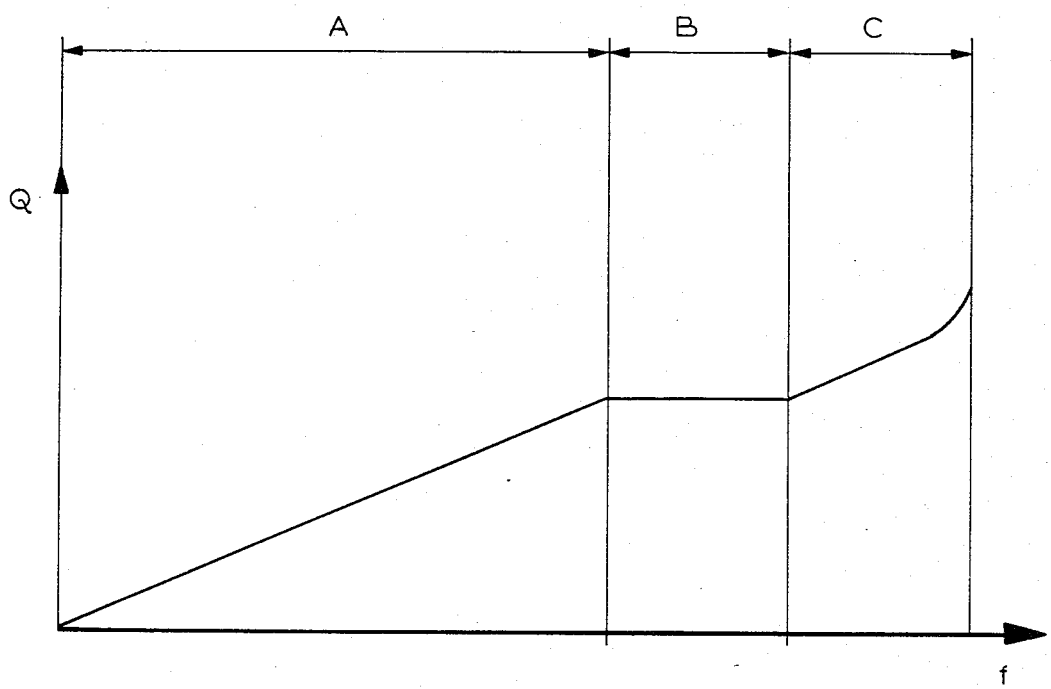

ELASTIC SUPPORT UNIT

BACKGROUND OF THE INVENTION

The present invention relates to elastic support units.

Elastic support units are known in the art. It is known to protect machines and aggregates against dynamic actions by elastically supporting the entire construction. In some cases, however, particularly when the protection against the action of earthquakes is to be carried out, the type and magnitude of the expected dynamic events are known only to a limited extent. In this situation, it is required to extend the protection outwardly beyond the calculated limits as far as possible. Elastic support units of the type mentioned above are used for these purposes. The known elastic units include elastic materials and a sliding layer. Since the sliding layer is brought into action first when the limit value for the loading of the elastic material is overcome, the subsequent events are taken in this case as uncontrollable conditions. It is guaranteed only that the protection extends only insignificantly outwardly of the calculated region.

SUMMARY OF THE INVENTION

Accordingly, it is an object of the invention to provide an elastic support unit which avoids the disadvantages of the prior art.

More particularly, it is an object of the present invention to provide an elastic support unit which expands protecting and calculated region.

In keeping with these objects and with others which will become apparent hereinafter, one feature of the present invention resides in an elastic support unit which has a supporting element movable over a total path and including a rigid member connectable to an object, an elastic member which is elastic in a horizontal direction and in a vertical direction, and a sliding member located substantially between the elastic member and the rigid member and sliding over a sliding path dimensioned so that it starts to act upon exceeding the permissible elastic deformation of the elastic member, these members being arranged so that first the elastic member deflects under the action of a horizontal force elastically horizontally until normally permissible stress in the elastic member so as to form a first elastic region, then after a horizontal restoring force of the elastic member exceeds a horizontal friction force between the sliding member and the rigid member the rigid member moves in a horizontal direction over the sliding path so as to form a second sliding region, and thereafter after exceeding the sliding path the elastic member is further elastically deformed by the rigid member with use of stress reserves between the permissible stress and a stress at the elasticity limit of the elastic element so as to form a third elastic region with the same elasticity as in the first elastic region and in the second sliding region, and then it is deformed plastically from a tensile limit stress to a breaking stress.

Among the terms used here, the permissible elastic deformation depends on the permissible stress, where vertical and horizontal deformation have to be taken into account. The permissible horizontal elastic deformation will depend on the vertical dead load of the element plus vertical elastic deformation. There may be different ratios between horizontal and vertical deformation, which all lead to the permissible stress. Stress reserve is the difference between the permissible stress explained herein above and a yield point. In emergency cases this range may be used, if necessary. "Safety reserve" means that the system is, in spite of it exceeding the permissible stress limit, in safe condition before it reaches yield point or finally the breaking point. The sliding layer may be of any material which has a certain friction factor corresponding to the design of the whole element, for low friction for example a sheet of Teflon. Friction has to be so high that no sliding occurs until the permissible stress limit, explained herein above, is reached in the elastic element, but that sliding will happen when the permissible stress in the elastic element is exceeded.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 3 is a diagram illustrating different elastic regions of the inventive elastic support unit.

DESCRIPTION OF THE PREFERRED EMBODIMENTS

Figure 1:
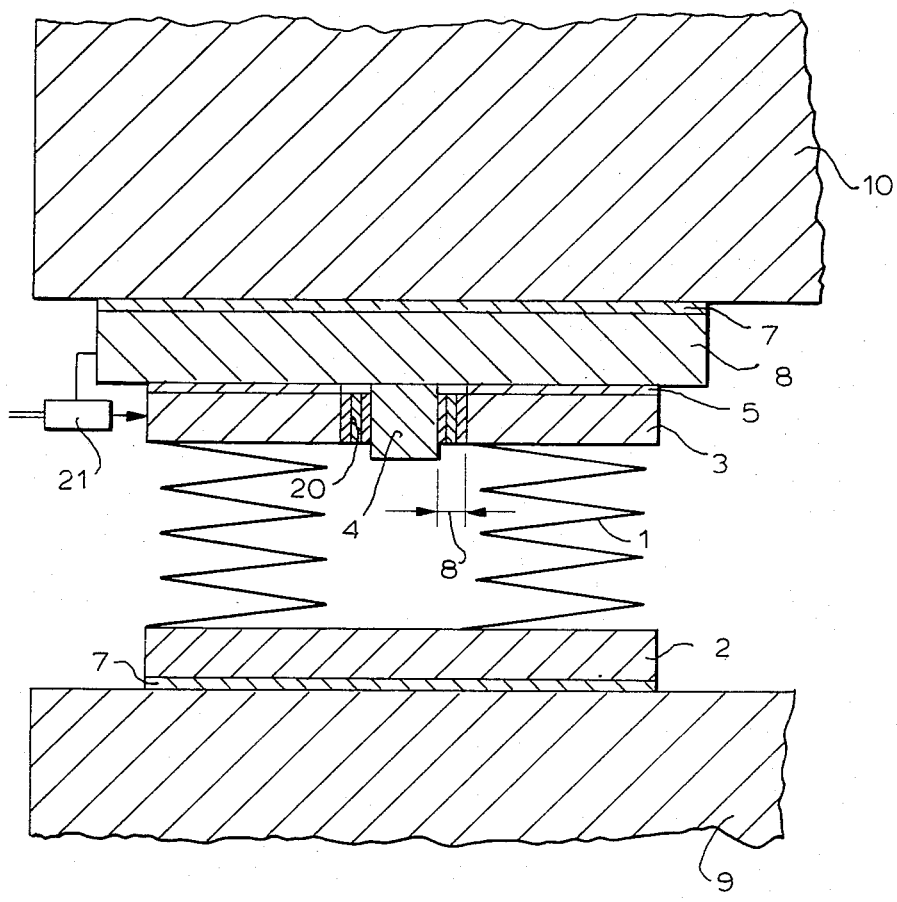
FIG. 1 is a view showing a section of an elastic support unit in accordance with the present invention.

An elastic support unit in accordance with the present invention, as illustrated in FIG. 1, has an elastic element which is identified by reference numeral 1 and formed, for example, as a helical pressure spring. The elastic element 1 is arranged between a lower rigid element 2 and an upper rigid element 3. A sliding layer 5 is provided on the upper rigid element 3.

For stochastic dynamic events, such as earthquakes, a further mechanically relatively rigid element 4, 6 is provided, wherein the sliding layer 5 is located between the upper rigid element 3 and the element 4, 6 and has sliding properties corresponding to a predetermined goal.

The elastic support unit serves for protecting buildings, aggregates and the like between an installation site or ground 9 and a foundation 10. For mounting the elastic unit, an intermediate layer 7 is provided. The intermediate layer is composed of a highly adhesive material which does not slide in condition of dynamic actions. In such a construction, sliding is performed first after overcoming the friction force. For the subsequent movement, the force which counteracts the movement is exclusively the friction force.

In accordance with the invention, a sliding path 8 is limited to a certain value. This limiting is attained by a design of the element or housing 4, 6. As can be seen from FIG. 1, the housing proper 6 is provided with a central inner projection 4, so that the sliding path 8 is actually formed at both sides between the inner projection 4 and walls of an opening in the upper rigid element 3 or the sliding level 5.

Figure 2:
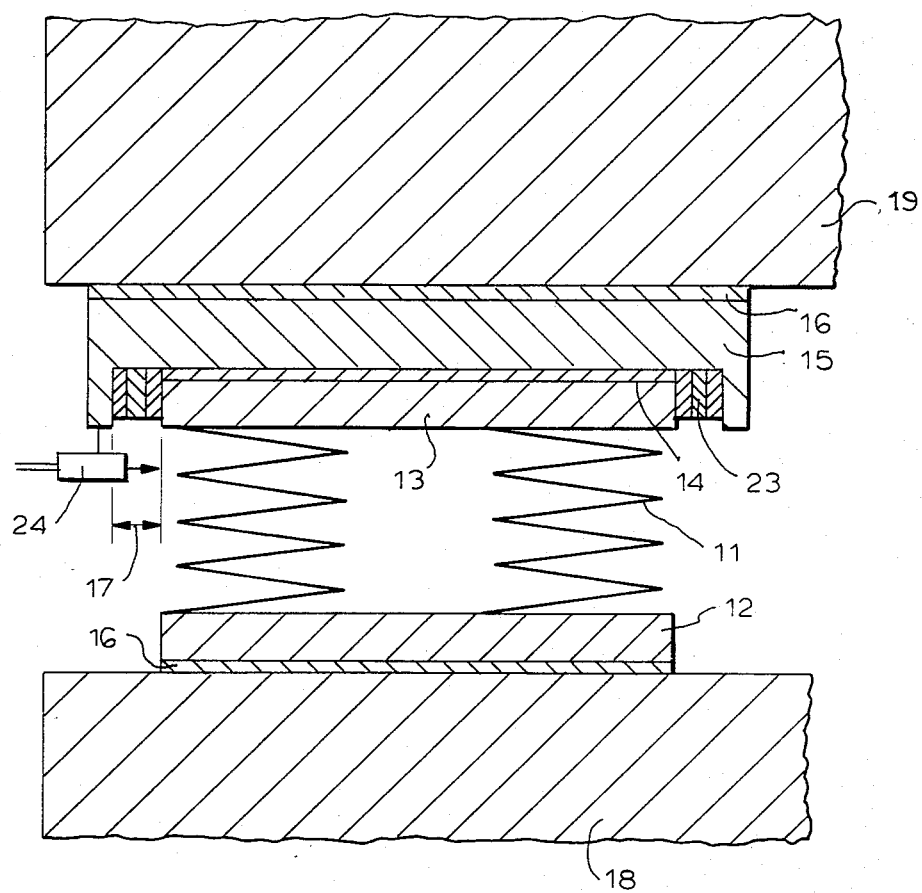
FIG. 2 is a view showing the inventive elastic support unit in accordance with a further embodiment.

The elastic support unit shown in FIG. 2 has an elastic element 11 located between a lower rigid element 12 and an upper element 13. A sliding layer 14 is provided on the upper element 13. A mechanically relatively rigid element 15 is further provided, wherein the sliding layer 14 is located between the upper rigid element 13 and the element 15. The elastic support unit is arranged between an installation site or ground 18 and a foundation 19. An intermediate layer 16 provides for mounting of the unit. The element or housing 15 is provided at its periphery with an apron-like projection so that a sliding path 17 is limited between the projection and the upper rigid element 13.

The housing 6 or 15 of the elastic support unit shown in FIGS. 1 and 2 may be rectangular or round.

As can be seen from the diagram shown in FIG. 3, which illustrates the relation between the plastic deformation Q and the frequency f, the inventive elastic support unit operates in the following manner. First of all, it acts in a purely elastic region A. After this, the elastic support unit acts in a sliding region B. At the end of the sliding path (region B) the elastic element is loaded again reacting here—elastically again—with the same elasticity as in the region A until the yield point is reached in the elastic element (region C).

The deformations which take place here and are first still elastic use the region of the structural reserves until the elasticity limit of the material. Still elastic deformations will occur in the elastic element between the permissible stress limit (end of region A) and the yield point of the elastic element. Thereby there is attained a protection of the supported objects for dynamic events which have the double magnitude of the value taken into calculation.

With the utilization of suitable materials, for example steel springs for the elastic elements 1 and 11, beyond yield point the plastic deformation of the elastic element is available to increase horizontal motion before the elastic element is destroyed (breaking point). After several hundred load alternations, the steel springs are not broken in the event of such load.

If the whole system is designed to react to emergency cases still in the purely elastic region A, for example, to an earthquake of a certain magnitude, the system will withstand even events (earthquakes) of unforeseen higher magnitude, reacting in region B and C or even finally with elastic deformation before the elastic element is destroyed, giving a high amount of safety beyond design.

The sliding path or intermediate space for the sliding movement can be filled with a readily destructible filling material of a small strength as identified by reference numeral 20 in FIG. 1 and reference numeral 23 in FIG. 2. The destruction of this material indicates whether the support unit acts within its safety reserve. The readily destructible filling material may be stearin, paraffin, etc. The sliding layer 5 and 14 provides for a certain sliding time. The filling material, however, can be selected so as to delay the sliding time. The delay can be determined by a respective strength or a respective structure of the filling material.

The filling material may include portions or fractions of different dimensions, or may be composed of various substances having different physical properties. Thereby, several stepped sliding zones are provided.

The inventive elastic support units can be controlled first to determine in which region it acts and thereby whether it needs to be exchanged. The respective control means are identified by reference numerals 21 in FIG. 1 and 24 in FIG. 2. They can be incorporated in an earthquake safety device. The control can be performed, for example, by measuring means which monitor variations of the sliding path or intermediate space.

It is believed to be evident that the inventive elastic support unit provides for highly advantageous results. Conventional supports may be equipped with the inventive support unit with low expenditures which are reliably below 0.1% of the entire value of the object to be protected. The protection of objects is expanded over dynamic events so as to amount to a multiple of the calculated values.

It will be understood that each of the elements described above, or two or more together, may also find a useful application in other types of constructions differing from the types described above.

While the invention has been illustrated and described as embodied in an elastic support unit, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An elastic support unit, comprising a supporting element movable over a total path and including a rigid member connectable to an object, an elastic member which is elastic in a horizontal direction and in a vertical direction, and a sliding member located substantially between said elastic member and said rigid member and sliding over a sliding path dimensioned so that it starts to act upon exceeding the permissible elastic deformation of said elastic member said members being arranged so that first said elastic member deflects under the action of a horizontal force elastically horizontally until normally permissible stress in said elastic member so as to form a first elastic region, then after a horizontal restoring force of said elastic member exceeds a horizontal friction force between said sliding member and said rigid member said rigid member moves in a horizontal direction over the sliding path so as to form a second sliding region, and thereafter after exceeding said sliding path said elastic member is further elastically deformed by said rigid member with use of stress reserves between the permissible stress and a stress at the elasticity limit of said elastic element so as to form a third elastic region with the same elasticity as in said first elastic region and in said second sliding region, and then it is deformed plastically from a tensile limit stress to a breaking stress.

2. An elastic support unit as defined in claim 1; and further comprising abutment means which limit the sliding path of said rigid member.

3. An elastic support unit as defined in claim 1, wherein, said members are arranged so that said rigid member acts upon said elastic member to elastically deform the latter within said first elastic region, then acts upon said sliding member to slide over said slide path within said second sliding region, and upon exceeding the stress reserves to plastically deforming said elastic member, said members act within said third elastic region.

4. An elastic support unit as defined in claim 1, wherein rigid member is associated with an intermediate space which allows sliding of said rigid member over said slide path and is at least partially filled with a readily destructible filling material of a small strength so that destruction of said material indicates whether said supporting element acts within its safety reserves.

5. An elastic support unit as defined in claim 4, wherein said intermediate space is fully filled with the readily destructible filling material.

6. An elastic support unit as defined in claim 4, wherein said readily destructible filling material is stearin.

7. An elastic support unit as defined in claim 4, wherein said readily destructible material filling is paraffin.

8. An elastic support unit as defined in claim 1; and further comprising control means for controlling the action of said supporting element to detect a respective one of said regions.

9. An elastic support unit as defined in claim 8, wherein said controlling means is arranged to be incorporated in a power unit of an earthquake safety device.

10. An elastic support unit as defined in claim 8, wherein said rigid member is associated with an intermediate space which allows sliding of said rigid member over said slide path, said controlling means including measuring means arranged to monitor variations of said intermediate space.

11. An elastic support as defined in claim 4, wherein said sliding member is formed as a sliding layer associated with said rigid member and having a predetermined friction so as to provide sliding to a predetermined time; and further comprising means for delaying sliding to a longer time.

12. An elastic support unit as defined in claim 11, wherein said readily destructible filling material has a strength providing the delaying so as to form said sliding delaying means.

13. An elastic support unit as defined in claim 11, wherein said readily destructible filling material has a structure providing for the delaying so as to form said sliding delaying means.

14. An elastic support unit as defined in claim 11, wherein said readily destructible filling material includes portions of different dimensions to provide several sliding zones.

15. An elastic support unit as defined in claim 11, wherein said readily destructible filling material includes portions having different physical properties so as to form several stepped sliding zones.

* * * * *